(12) United States Patent
Wu et al.

(10) Patent No.: US 8,457,266 B2
(45) Date of Patent: Jun. 4, 2013

(54) METHOD AND DEVICE FOR MULTI-CHANNEL DATA ALIGNMENT IN TRANSMISSION SYSTEM

(75) Inventors: Shih-Chi Wu, Zhubei (TW);
Meng-Chin Tsai, Yunlin County (TW);
Tsung-Ping Chou, Taichung (TW)

(73) Assignee: Global Unichip Corporation, Hsinchu (TW)

( * ) Notice: Subject to any disclaimer, the term of this patent is extended or adjusted under 35 U.S.C. 154(b) by 353 days.

(21) Appl. No.: 12/929,882

(22) Filed: Feb. 23, 2011

(65) Prior Publication Data

US 2012/0020436 A1    Jan. 26, 2012

(30) Foreign Application Priority Data

Jul. 21, 2010  (TW) ................. 99123891 A

(51) Int. Cl.
*H04L 7/00*       (2006.01)
(52) U.S. Cl.
USPC .......................................... 375/354; 375/371

(58) Field of Classification Search
USPC .................. 375/354, 371, 372; 370/503, 505
See application file for complete search history.

(56) References Cited

U.S. PATENT DOCUMENTS

| | | | | |
|---|---|---|---|---|
| 5,251,210 A | * | 10/1993 | Mann et al. .................... | 370/519 |
| 7,046,174 B1 | * | 5/2006 | Lui et al. ........................ | 341/101 |
| 7,467,335 B2 | * | 12/2008 | Otto et al. ...................... | 714/700 |

* cited by examiner

*Primary Examiner* — David B Lugo
(74) *Attorney, Agent, or Firm* — Bacon & Thomas, PLLC

(57) ABSTRACT

A method and a device for multi-channel data alignment in a transmission system are provided, wherein the method comprises receiving a first stream data and a second stream data, determining a deleting/inserting state of the first stream data and the second stream data to generate an information of mismatch data due to a speed difference situation, generating a reverse inserting control signal or a reverse deleting control signal to completely restore the original first stream data and/or the original second stream data at a transmission end, deleting/inserting the first stream data and the second stream data simultaneously after receiving the deleting/inserting state of the first stream data and the second stream data, and outputting the corrected first stream data and the corrected second stream data without mismatching.

9 Claims, 6 Drawing Sheets

METHOD AND DEVICE FOR MULTI-CHANNEL DATA ALIGNMENT IN TRANSMISSION SYSTEM

BACKGROUND OF THE INVENTION

1. Field of the Invention

The present invention generally relates to a method and a device for multi-channel data alignment, and more particularly to a method and a device for multi-channel data alignment in a transmission system by analyzing a deleting and inserting state of each channel from the multi-channel data.

2. Description of the Prior Art

The technology using non-common clock generators as a serializer at a transmission end and as a deserializer at a receiving end is generally used in a conventional transmission system to transmit communication data. For forming as a multi-channel to transmit bulk data with a high bandwidth, the usage quantity of serializers and deserializers (SerDes) is enhanced.

In the serializers and the deserializers of the multi-channel of different clock generators, it is important to control the multi-channel stream data alignment, i.e. time delay analyzer. In the conventional transmission system, the deserializers and time delay analyzer are usually designed and practiced simultaneously. An interaction between the deserializers and time delay analyzer is not generally disclosed. The present invention mainly discloses a design of a time delay analyzer using information outputted from a plurality of deserializers to achieve multi-channel stream data alignment.

SUMMARY OF THE INVENTION

The present invention is directed to a method for multi-channel data alignment in a transmission system, wherein a mismatch of the multi-channel data due to a speed difference situation formed from the transmission end and the receiving end is compensated to correct the mismatch channel data into the correct channel data.

The present invention is directed to a device for multi-channel data alignment in a transmission system, wherein a mismatch channel data is corrected into a correct channel data by analyzing the received multi-channel data to determine whether a redundant symbol needs to be deleted or inserted or not.

The present invention provides a method for multi-channel data alignment in a transmission system comprising (a) receiving a first stream data and a second stream data; (b) determining a deleting/inserting state of the first stream data and the second stream data to generate an information of mismatch data due to a speed difference situation; (c) generating a reverse inserting control signal or a reverse deleting control signal to completely restore the original first stream data and the original second stream data at a transmission end according to the deleting/inserting state of the first stream data and the second stream data; (d) deleting/inserting all stream data simultaneously after receiving the deleting/inserting state of all stream data; (e) outputting the corrected first stream data and the corrected second stream data without mismatching.

The present invention provides a device for multi-channel data alignment in a transmission system comprising a buffering unit and a time delay processing unit. The buffering unit receives a first stream data and a second stream data. The time delay processing unit provides a plurality of push signals and a plurality of pop signals and restoring the original first stream data and the original second stream data at a transmission end by the push signals according to a reverse inserting control signal or a reverse deleting control signal. In addition, after the reverse inserting control signal or the reverse deleting control signal of the first stream data and the second stream data are completely received, the first stream data and the second stream data in the buffering unit are read out by controlling the pop signals, so as to match the first stream data with the second stream data.

The point of the present invention is about the data being transmitted serially and the skew phenomenon between the stream data being existed when processing multi-channel data transmission.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Reference will now be made in detail to specific embodiments of the present invention. Examples of these embodiments are illustrated in the accompanying drawings. While the invention will be described in conjunction with these specific embodiments, it will be understood that it is not intended to limit the invention to these embodiments. In fact, it is intended to cover alternatives, modifications, and equivalents as may be included within the spirit and scope of the invention as defined by the appended claims. In the following description, numerous specific details are set forth in order to provide a through understanding of the present invention. The present invention may be practiced without some or all of these specific details. In other instances, well-known process operations are not described in detail in order not to obscure the present invention.

Figure 1:
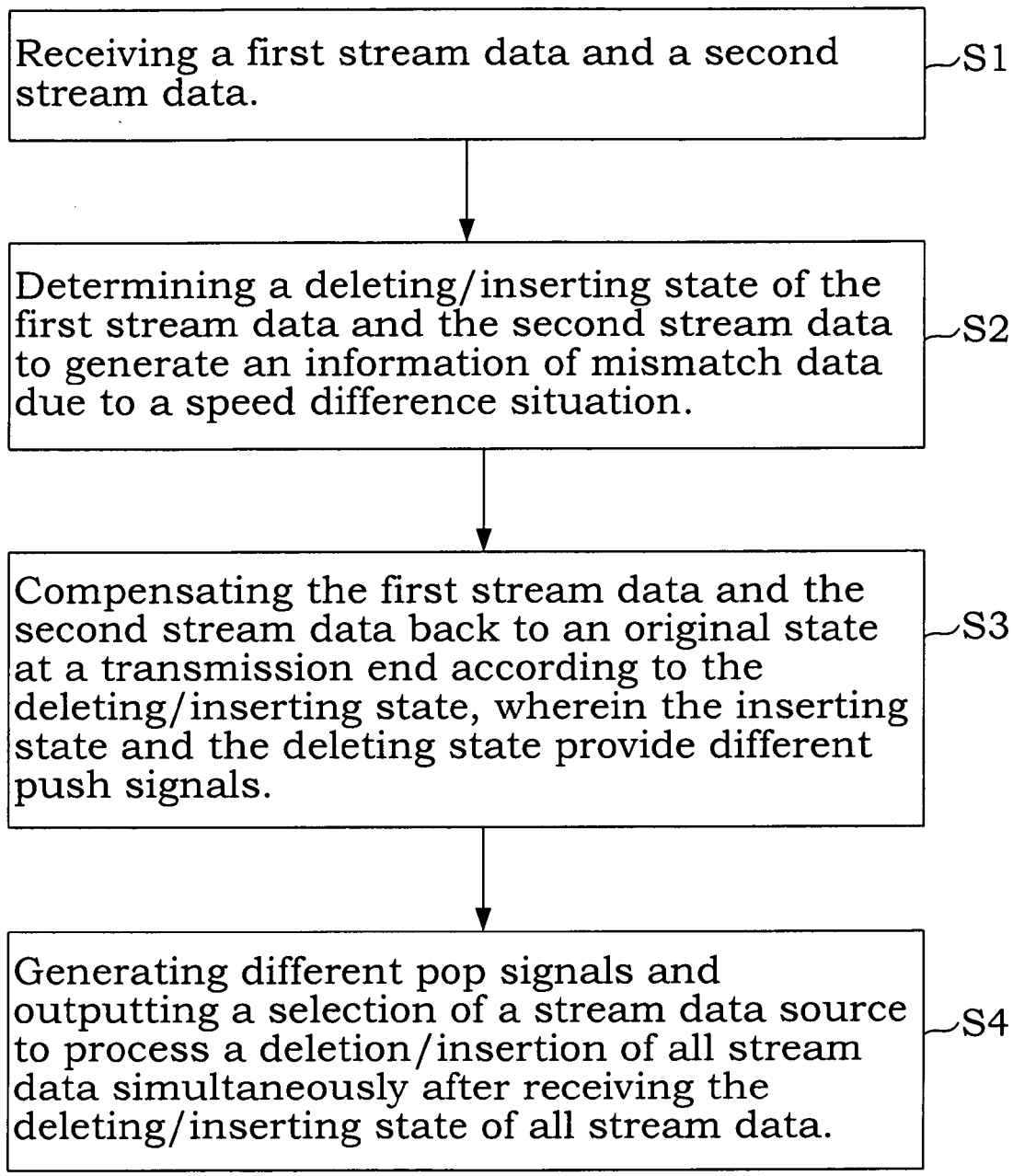
FIG. 1 illustrates a flow chart of a multi-channel data alignment method in a transmission system according to an embodiment of the present invention.

FIG. 1 illustrates a flow chart of a multi-channel data alignment method in a transmission system according to an embodiment of the present invention. Referring to FIG. 1, in the present embodiment, the method comprises: receiving a first stream data and a second stream data at step S1; next determining a deleting/inserting state of the first stream data and the second stream data to generate a mismatch information of two stream data due to a speed difference situation at step S2; and then compensating the first stream data and the second stream data back to an original state at a transmission end according to the deleting/inserting state at step S3, wherein the inserting state and the deleting state provide different push signals; and generating different pop signals and outputting a selection of a stream data source to process a deletion/insertion of all stream data simultaneously after receiving the deleting/inserting state of all stream data at step S4. After processing the previous steps, the first stream data and the second stream data corrected without mismatch are generated.

In addition, the above-mentioned push signals further comprise three kind meanings, push0 presents not to save the stream data in a speed difference buffering unit, push1 presents to save a stream data unit in the speed difference buffering unit, and push2 presents to save a stream data unit and a redundant symbol unit in the speed difference buffering unit.

The pop signals further comprise the following meanings, pop0 presents not to read out the stream data from the speed difference buffering unit, and pop1 presents to read out a stream data unit from the speed difference buffering unit.

Figure 2:
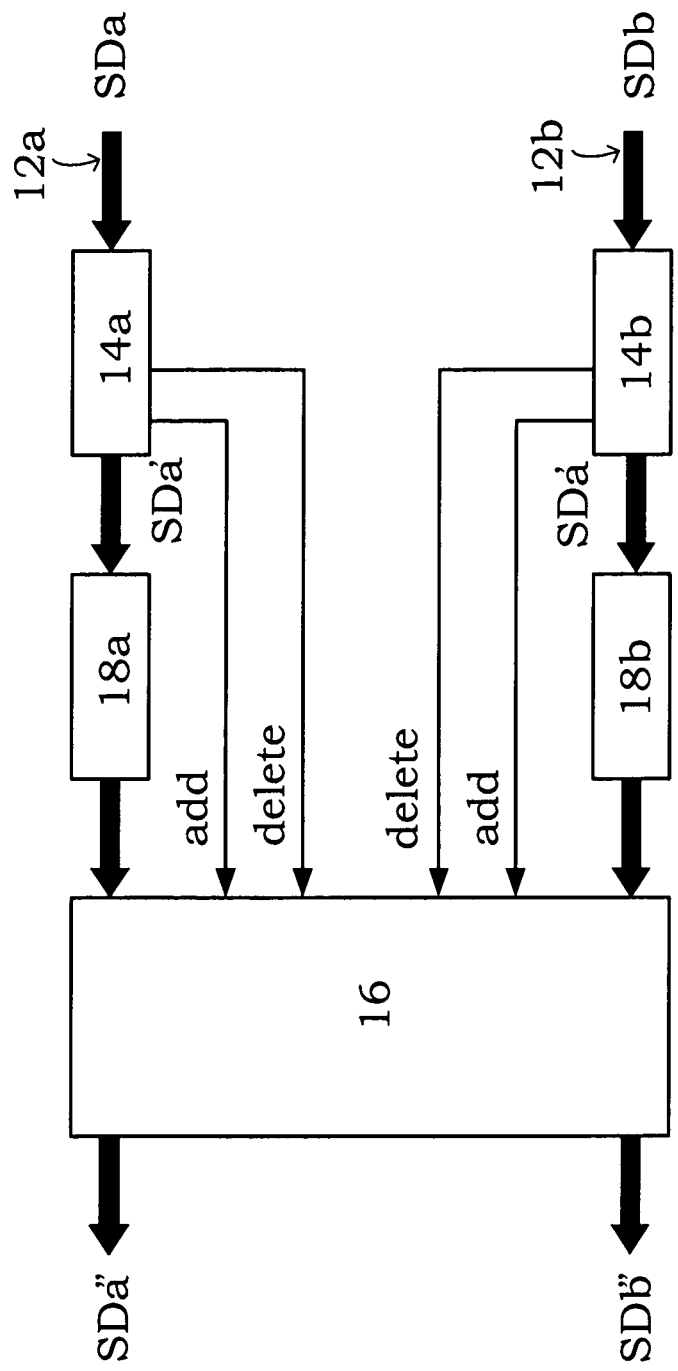
FIG. 2 illustrates a schematic diagram of a multi-channel data alignment device in a transmission system according to an embodiment of the present invention.

FIG. 2 illustrates a schematic diagram of a multi-channel data alignment device in a transmission system according to an embodiment of the present invention. Referring to FIG. 2, in the present embodiment, a multi-channel data alignment device 10 in the transmission system comprises two receiving units 12a, 12b, two speed difference buffering units 14a, 14b and a time delay processing unit 16. The receiving units 12a, 12b respectively receive a first stream data SDa and a second stream data SDb. The speed difference buffering units 14a, 14b connect the receiving units 12a, 12b for receiving the first stream data SDa and the second stream data SDb and generating different stream data according to a speed difference situation formed from different clock generators at a transmission end and a receiving end. A first stream data SDa' and a second stream data SDb' are correspondingly compensated by the first stream data SDa and the second stream data SDb. The compensating time points are different to one another since speed difference buffering units 14a, 14b are operated separately. The time delay processing unit 16 is for providing a plurality of push signals and a plurality of pop signals and matching the first stream data SDa' and the second stream data SDb' with time delay by the push signals and the pop signals according to a reverse inserting control signal add or a reverse deleting control signal del, so as to output the first stream data SDa" and the second stream data SDb" corrected without mismatch. In another word, the time delay processing unit 16 may regenerate stream data without delay time and matching with one another from the stream data with delay time. Note that the amount of the channel is not limited to two even though the embodiment illustrated herein is a two-channel stream data alignment. All kinds of the multi-channel data transmission are included in the scope of the present invention.

In an embodiment, the multi-channel data alignment device 10 further comprises glue logic units 18a, 18b connecting the speed difference buffering unit 14a, 14b and the time delay processing unit 16 for transmitting the first stream data SDa' and the second stream data SDb' from the receiving end to time delay processing unit 16.

Figure 3:
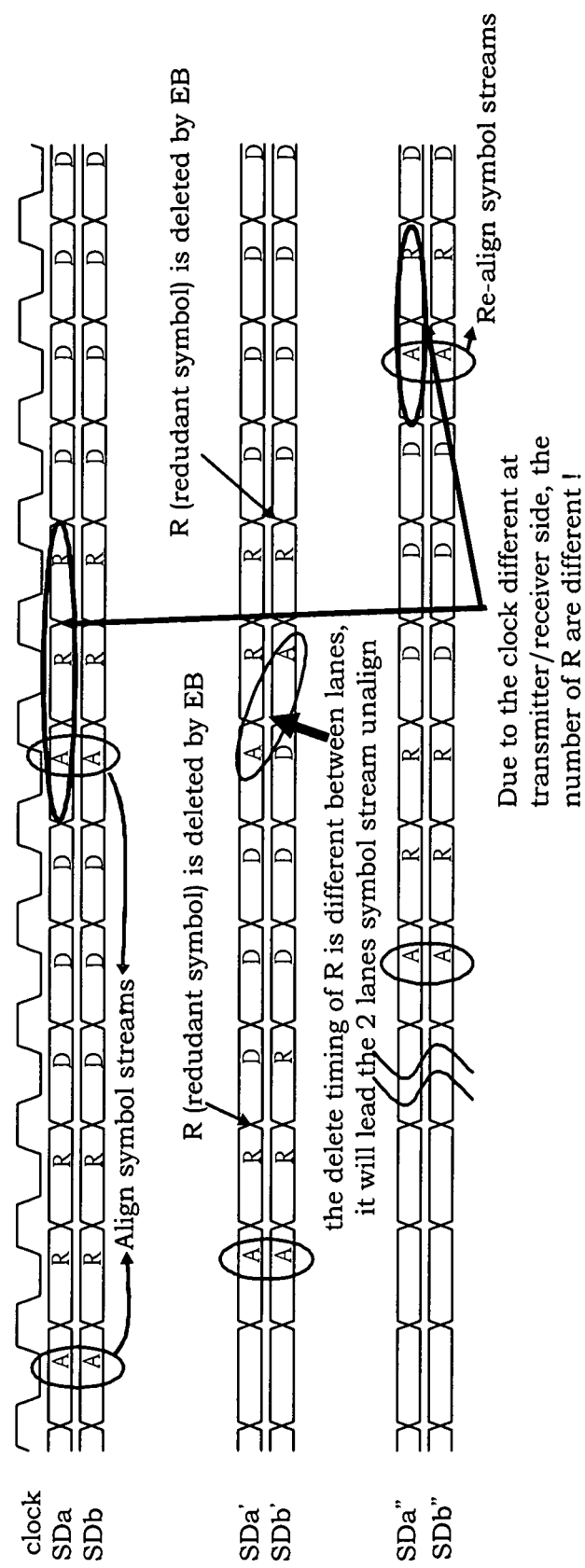
FIG. 3 illustrates a sequence diagram of a multi-channel data alignment device in a transmission system according to an embodiment of the present invention.

FIG. 3 illustrates a sequence diagram of a multi-channel data alignment device in a transmission system according to an embodiment of the present invention. Referring to FIG. 3, in the present sequence diagram, the first stream data SDa and the second stream data SDb are stream signals transmitted from the transmission end or the received stream signals before the transmission end receives, and the first stream data SDa' and the second stream data SDb' are the stream data passing the speed difference buffering unit. Herein, it is assumed that the first stream data SDa' is mismatched with the second stream data SDb' due to a redundant symbol R thereof is deleted during the speed difference of the first stream data SDa' is compensated (passing the speed difference buffering unit), thus matched stream signals may be outputted by determining whether the redundant symbol R is missed or not and properly pushing and popping the signals according to the multi-channel data alignment device of the present invention, so as to obtain the first stream data SDa" and the second stream data SDb".

Figure 4:
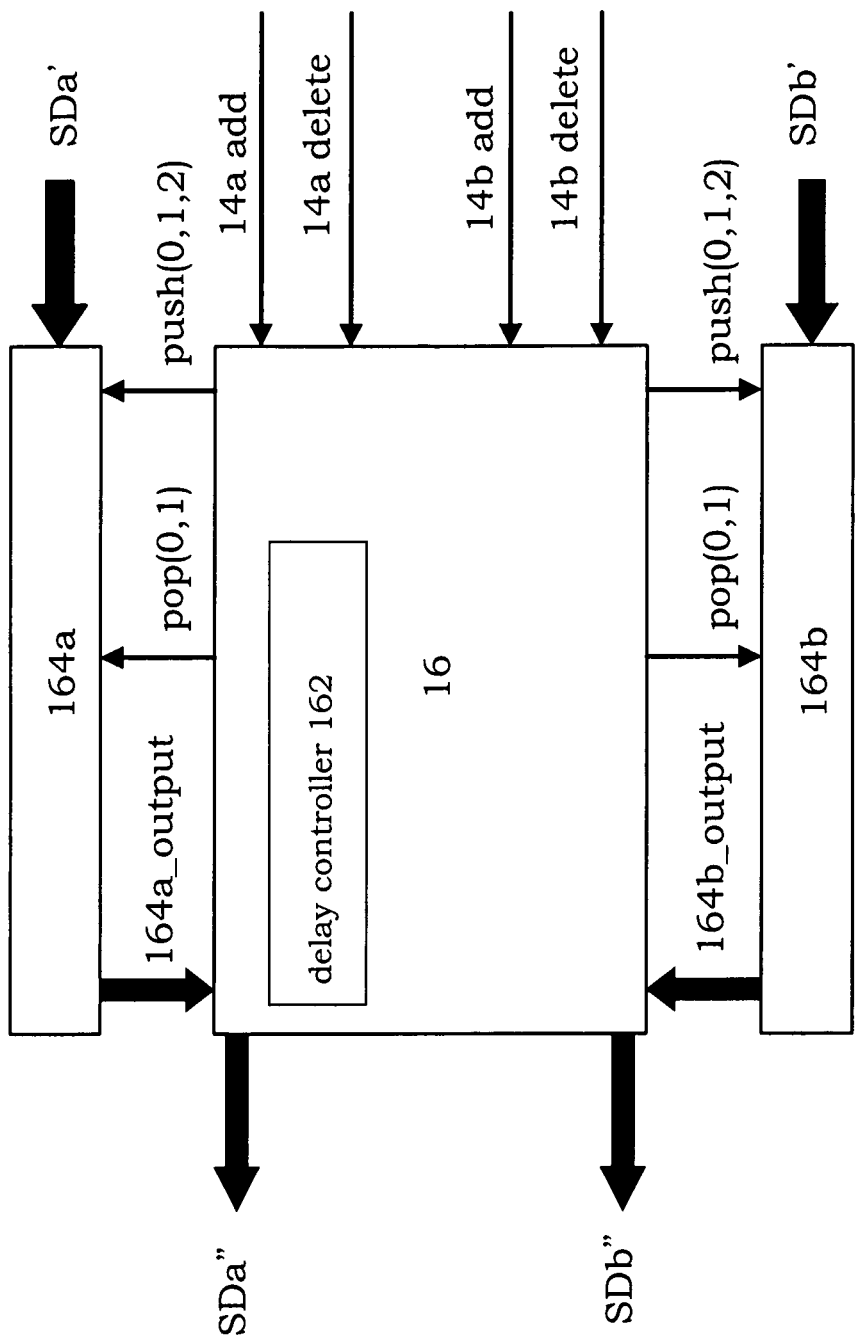
FIG. 4 illustrates a detail diagram of a time delay processing unit of a multi-channel data alignment device in a transmission system according to an embodiment of the present invention.

FIG. 4 illustrates a detail diagram of a time delay processing unit of a multi-channel data alignment device in a transmission system according to an embodiment of the present invention. Referring to FIG. 4, the time delay processing unit 16 herein comprises a time delay controller 162 and a plurality of deskew buffers 164a, 164b. The deskew buffers 164a, 164b are used for receiving the first stream data SDa' and the second stream data SDb', and the time delay controller 162 are used for receiving the reverse inserting control signal add and the reverse deleting control signal del and correspondingly generating the push signal PUSH and the pop signal POP. Time delay controller 162 receives the first stream data SDa' and the second stream data SDb' from buffers 164a, 164b and outputs the first stream data SDa" and the second stream data SDb" corrected without mismatch.

Figure 5:
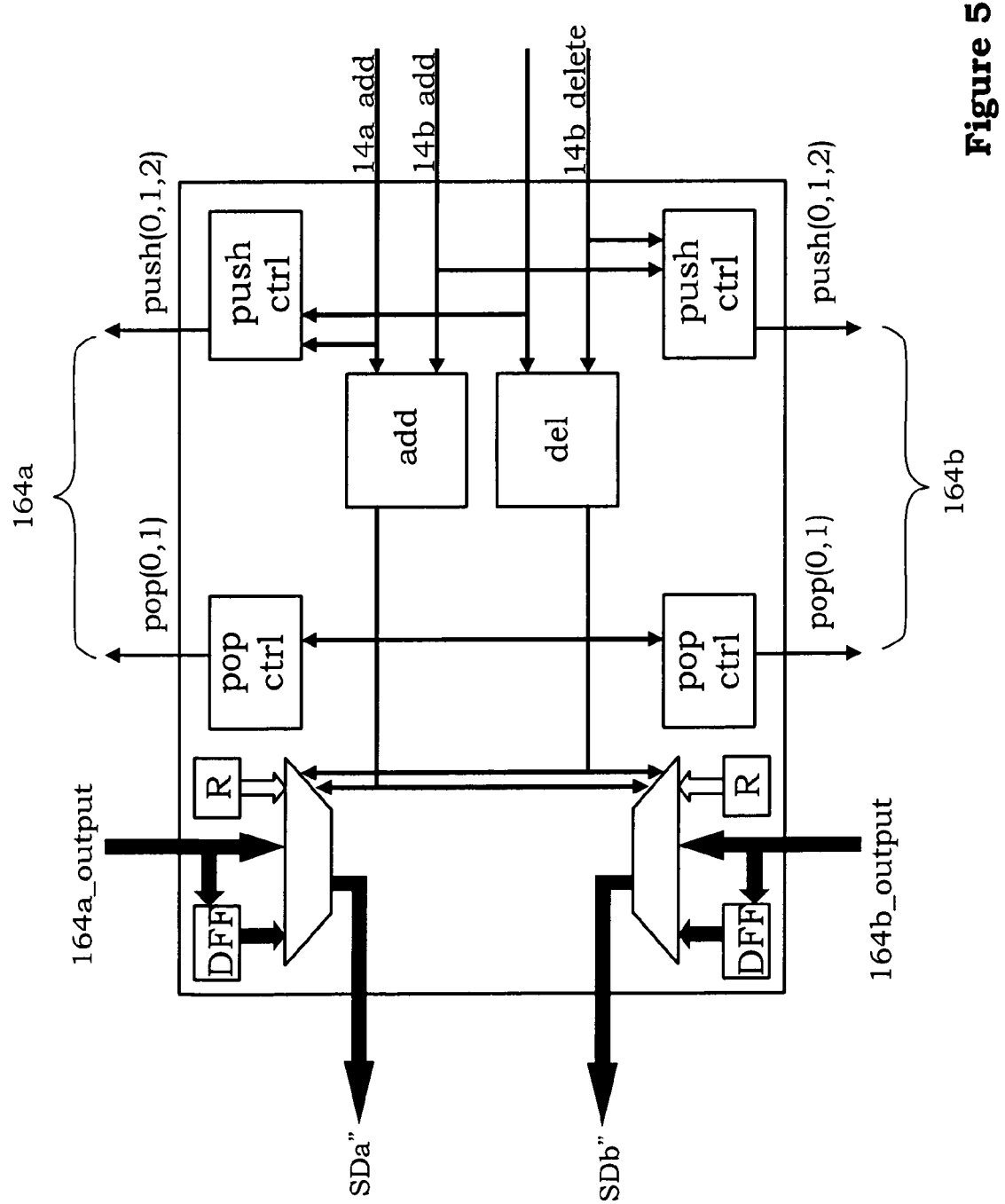
FIG. 5 illustrates an inner detail diagram of a time delay processing unit of a multi-channel data alignment device in a transmission system according to an embodiment of the present invention.
Figure 6:
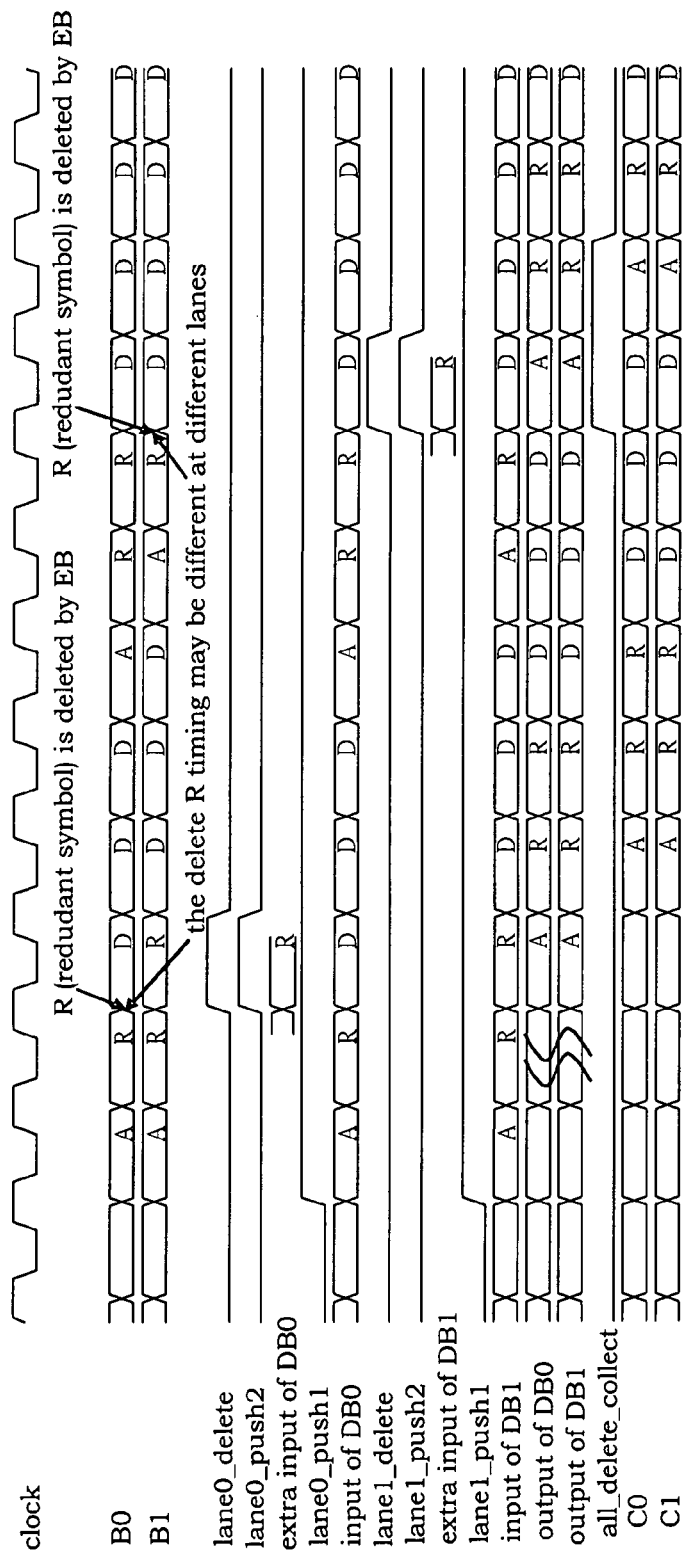
FIG. 6 illustrates a sequence diagram of a multi-channel data alignment device in a transmission system according to an embodiment of the present invention.

Further refer to an inner detail diagram as shown in FIG. 5, wherein block DEF presents the stream data delayed a cycle, and the block R presents pushing a redundant symbol to the stream data. Referring to FIG. 5 together with corresponding sequence diagram as shown in FIG. 6.

Compared with the prior art, the method and the device for multi-channel data alignment in the transmission system of the present invention resolve the mismatch situation between the multi-channel data at the receiving end of the transmission system. Particularly, the present invention transmits the data serially and resolves the skew situation existed between the stream data when processing multi-channel data transmission.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for multi-channel data alignment in a transmission system, comprising:
   receiving a first stream data and a second stream data;
   determining a deleting/inserting state of the first stream data and the second stream data to generate an information of mismatch data due to a speed difference situation;
   generating a reverse inserting control signal or a reverse deleting control signal to completely restore original of the first stream data and the second stream data at a transmission end;
   deleting/inserting the first stream data and the second stream data simultaneously after receiving the deleting/inserting state of the first stream data and the second stream data; and outputting corrected of the first stream data and the second stream data without mismatch.

2. The method as claimed in claim 1, wherein the reverse inserting control signal and the reverse deleting control signal are for providing a plurality of push signals and a plurality of pop signals.

3. The method according to claimed in claim 2, wherein after the reverse inserting control signal or the reverse deleting control signal of the first stream data and the second stream data are received, the first stream data and the second stream data in a buffering unit are read out by controlling the pop signals, so as to match the first stream data with the second stream data.

4. The method according to claimed in claim 2, wherein the push signals further comprises:
   - not saving the first stream data and the second stream data in the buffering unit;
   - saving the first stream data and the second stream data in the buffering unit; and
   - saving the first stream data, the second stream data and an unit redundant symbol in the buffering unit.

5. The method according to claimed in claim 2, wherein the pop signals further comprises:
   - not reading out the first stream data and the second stream data from the buffering unit; and
   - reading out the first stream data and the second stream data from the buffering unit.

6. A device for multi-channel data alignment in a transmission system, comprising:
   - a receiving unit for receiving a first stream data and a second stream data respectively;
   - a speed difference buffering unit connecting the receiving unit for receiving the first stream data and the second stream data, generating the first stream data and the second stream data different to one another according to a speed difference situation formed from different clock generators at a transmission end and a receiving end, and correspondingly compensating the first stream data and the second stream data; and
   - a time delay processing unit for providing a plurality of push signals and a plurality of pop signals and matching the first stream data and the second stream data with time delay by the push signals and the pop signals according to a reverse inserting control signal or a reverse deleting control signal, so as to output the first stream data and the second stream data corrected without mismatch.

7. The device according to claimed in claim 6, further comprising a glue logic unit connecting the speed difference buffering unit and the time delay processing unit.

8. The device according to claimed in claim 6, wherein the time delay processing unit comprises a time delay controller and a plurality of deskew buffers, the deskew buffers are used for receiving the first stream data and the second stream data, and the time delay controller are used for receiving the reverse inserting control signal and the reverse deleting control signal and correspondingly generating the push signals and the pop signals.

9. The device according to claimed in claim 8, wherein the time delay processing unit receives the first stream data and the second stream data from the buffers and outputs the first stream data and the second stream data corrected without mismatch.

* * * * *